Feb. 4, 1969 E. B. ESTERS 3,426,224
DYNAMOELECTRIC MACHINE WITH PLURAL SPLIT
PERMANENT MAGNET STATORS
Filed Aug. 26, 1966
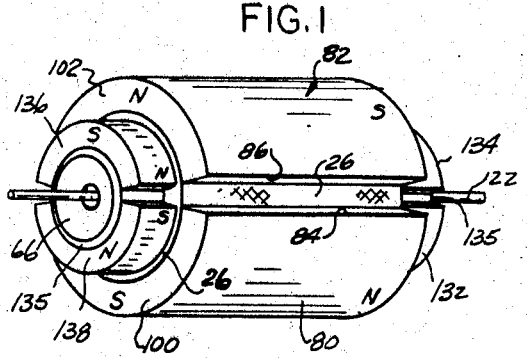
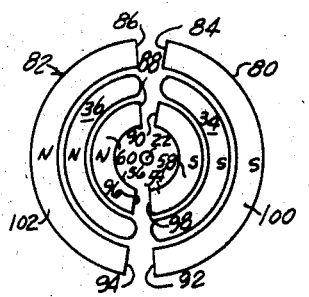
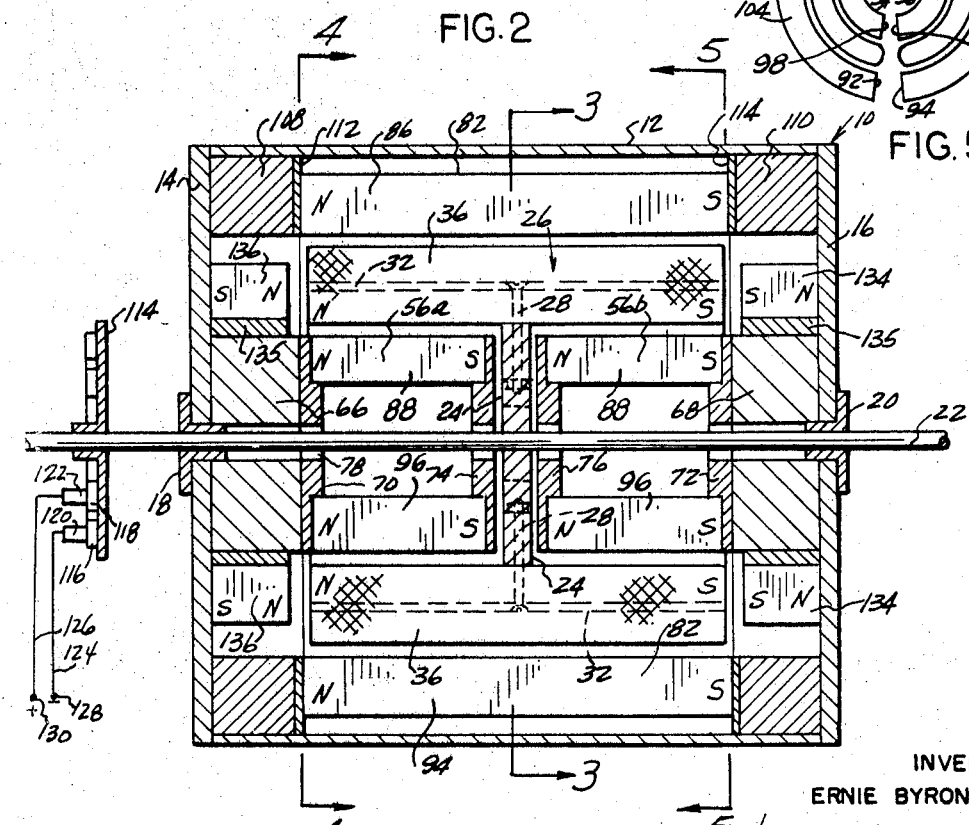
INVENTOR
ERNIE BYRON ESTERS
BY *Hauke, Kress, & Gifford*
ATTORNEYS Feb. 4, 1969  E. B. ESTERS  3,426,224
DYNAMOELECTRIC MACHINE WITH PLURAL SPLIT
PERMANENT MAGNET STATORS
Filed Aug. 26, 1966  Sheet 2 of 2
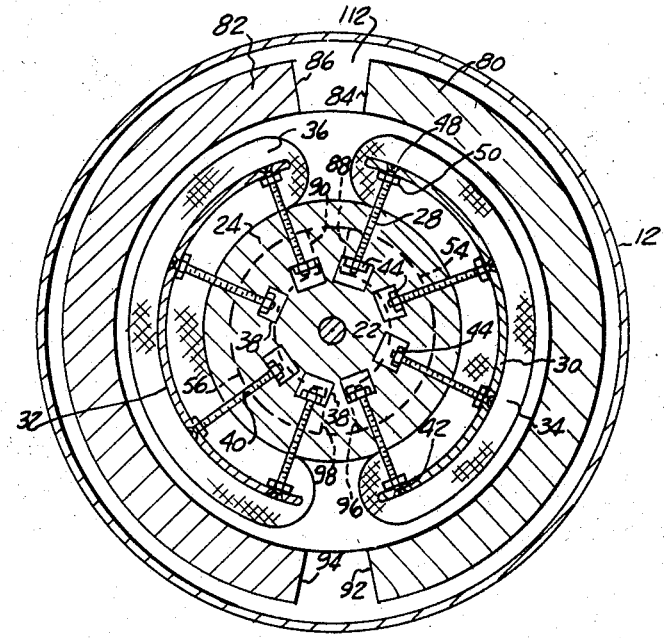
FIG. 3
FIG. 6
FIG. 7
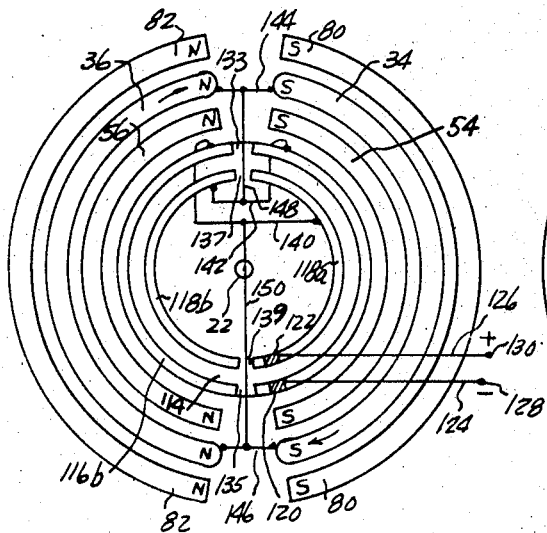
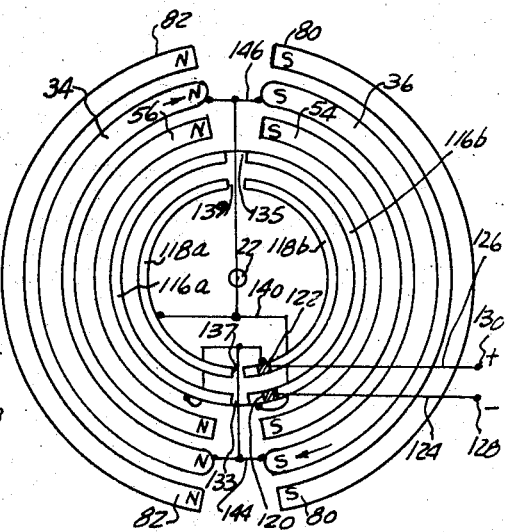
INVENTOR
ERNIE BYRON ESTERS
BY Hauke, Kress, & Gifford
ATTORNEYS United States Patent Office 3,426,224
Patented Feb. 4, 1969

3,426,224
DYNAMOELECTRIC MACHINE WITH PLURAL
SPLIT PERMANENT MAGNET STATORS
Ernie Byron Esters, 54 Elmhurst,
Highland Park, Mich. 48203
Filed Aug. 26, 1966, Ser. No. 575,306
U.S. Cl. 310—46                                10 Claims
Int. Cl. H02k 37/00

ABSTRACT OF THE DISCLOSURE

A dynamoelectric machine having a cylindrical hollow rotor, a cylindrical inner stator, a cylindrical outer stator and annular end stators.

---

The present invention relates to dynamoelectric machines, and more particularly to electric motors and generators having a unique arrangement of rotor and stator members so as to achieve a high degree of efficiency and simplicity.

Most electric motors in use at the present time have an annular stator and a cylindrical rotor disposed within the stator, such that magnetic attractive and repulsive forces are created at the cylindrical interface, or air gap, between the rotor and the stator. Magnetic fields are generated in the rotor and in the stator. Such magnetic fields may be created by electric currents being supplied to the windings or coils forming the rotor and the stator. In some electric motors, the magnetic fields react with each other and produce forces of attraction and repulsion between the rotor and the stator that cause the rotor to rotate and that cause the output shaft of the motor attached to the rotor to rotate in unison therewith. Alternately, in other electric motors, either the magnetic fields generated by the rotor or the stator, but not both, may be alone generated by electric currents applied through the windings, the other magnetic fields being caused by permanent magnets.

Another type of electric motors, often called the axial-gap type, is provided with a disc-like rotor, keyed to the motor output shaft, and the stator or stators are axially arranged relatively to the rotor such that the interface, or gap, through which the attractive and repulsive forces of the magnetic fields are created are axially or longitudinally aligned with respect to the motor housing and output shaft.

The present invention provides for an electric motor having a hollow rotor which, in its simplest form, has two windings or coils wound in such manner as to cause parallel magnetic fields longitudinally, or axially, directed in opposite directions. A first stator is disposed within the hollow cylindrical rotor and a second stator, also cylindrical in shape, is disposed so as to surround the rotor. Preferably, a third and fourth stators are provided on the ends of the motor so as to form an axial gap, or interface, between the annular ends of the rotor and the magnetic field created by such stators. An electric motor according to the principle of the invention has a far greater efficiency than conventional motors and is often of substantially simpler construction as a DC motor can be made with a rotor having only a pair of windings as coils wound thereon, a pair of inner stator permanent magnets, a pair of outer stator permanent magnets and a pair of end stator permanent magnets on one end or on both ends of the motor, such permanent magnets being each shaped substantially as a horseshoe or half annulus.

The principal object of the present invention, consequently, is to provide an electric motor or generator, capable of running on a direct current power supply or capable of producing a direct current EMF, having a cylindrical hollow rotor supported for rotation about its axis and having at least a pair of stators, one of which is disposed within the rotor and the other of which is disposed without.

Another object of the invention is to provide an electric motor or generator of the character indicated, further having an axially disposed end stator at one or at both ends of the rotor.

A further object of the present invention is to provide an electric motor or generator of the character indicated having simple permutating means so as to permit the motor to be operated on direct current and the generator to generate direct current.

An additional object of the present invention is to provide an electric motor or generator wherein the interface area between the rotor and the stators consists of almost the full area of such rotor so as to greatly improve the efficiency of the motor or generator as compared to conventional configurations.

A further object of the invention is to provide coil windings, commutator arrangements and flux channeling arrangements for use with the rotor-stator configuration forming the electric motor or generator of the present invention.

Other objects, advantages and applications of the present invention will become apparent to those skilled in the art when the following detailed description of an example of embodiment of the principles of the invention is read in conjunction with the accompanying drawings wherein:

FIG. 1 is a perspective schematic view of an example of electric motor or generator in accordance with the principles of the present invention;

FIG. 2 is an axial longitudinal cross sectional view of the embodiment of FIG. 1;

FIG. 3 is a transverse cross sectional view along line 3—3 of FIG. 2;

FIG. 4 is a schematic end view substantially from line 4—4 of FIG. 2;

FIG. 5 is also a schematic end view, but as seen from line 5—5 of FIG. 2; and

FIGS. 6 and 7 are schematic diagrammatic representations of the commutation arrangement of the example of embodiment of the present invention illustrated in FIGS. 1–3.

Referring now to the drawings, the electric motor or generator represented at FIGS. 1–5 is an embodiment of an example of structure according to the principles of the invention in its simplest form, i.e. using only a pair of coil windings on the stator. It is evident that the construction of an electric motor according to the principles of the invention is substantially structurally alike the generator version thereof, and the following description has been chosen to relate functionally to the operation of a structure according to the invention in its electric motor mode, being it evident that the operation of the structure in its electric generator mode is exactly the inverse, that is the shaft of the apparatus is mechanically rotated and a direct current is supplied across the brushes thereof.

An electric motor according to the principles of the invention, in the form wherein only two coil or windings are mounted on the rotor, comprises a frame 10 including a substantially cylindrical housing 12 and a pair of end plates 14 and 16. The end plates 14 and 16 are fastened relatively to the housing 12 by any conventional means, not shown, such as elongated threaded rods, nuts and washers. The end plates 14 and 16 are provided with bearing means 18 and 20, substantially axially aligned with the center axis of the housing 12 which may be plain bearings as shown, ball bearings, needle bearings or the like. The bearing means 18 and 20 support a rotatable shaft 22 adapted to be journaled through said bearing means. The rotatable shaft 22 supports substantially at mid-distance between its end journals a disk member 24 keyed or otherwise fastened thereon, and the disk member in turn supports a hollow cylindrical rotor 26 by way of threaded rods 28 disposed radially. As seen more clearly in FIGS. 2–5, the hollow cylindrical rotor 26 is preferably made, in the embodiment of the invention herein described, of two half cylindrical semi-annular cores 30 and 32 made of soft iron or like material, around which are wound respectively windings 34 and 36 each forming a coil wound in a direction opposite to the other so that, when electric current is circulating therethrough, the respective ends of the windings have magnetic poles of opposite polarities, such that the magnetic fields created by the two coil windings 34 and 36 are substantially of opposite magnetic flux directions.

As shown most clearly in FIG. 3, disk 24 is provided with a series of substantially square or rectangular cut-out portions 38 regularly disposed at regular radial intervals proximate the periphery thereof, and having threaded radial bores 40 disposed between the peripheral edge of the disk and the corresponding edge or sidewall of each cut-out portion 38. Through radial bores 40 are introduced the threaded ends of rods 28 which are held securely therein by means of nuts 44 disposed within the cut-out portions. The other end of the rods 28 is provided with means adapted to support cores 30 and 32 by any conventional fastening means such as riveting, welding, or, as shown, by way of the end of each rod 28 being provided with an enlarged head 48 disposed on the outer face of the core, and a co-operating nut 50 disposed on the inner surface of the core, the body of the rod 28 passing through an aperture 42 in the core, and the nut 50 being used for clamping securely the core between the nut and the rod head 48.

As shown in FIGS. 1–5, the stator assembly of the motor consists of an inner stator, generally cylindrically-shaped, and made of two half cylindrical, or horseshoe-shaped, strong permanent magnets as identified at 54 and 56. The two magnets, 54 and 56, are symmetrically disposed coaxially to the shaft and to the rotor thus respectively forming half-annular end faces 58 and 60 on one end, and 62 and 64 on the other end. Magnets 54 and 56 are so arranged relatively to one another that the half-annular face of one magnet at one end has a magnetic pole opposite to the magnetic pole of the face of the other magnet. In constructions of the electrical motor of the invention where the rotor 26 is supported by a centrally disposed disk 24, each magnet 54 or 56, as seen more clearly in FIG. 2 with regard to magnet 56, is actually made of two half-magnets, as shown at 56a and 56b, which are disposed in axial alignment with each other, and which are supported from the end flanges by means of annular rings 66 and 68, supporting in turn shouldered mounting plates 70 and 72. Additional shouldered disks such as shown at 74 and 76, may be connected with annular rings 66 and 68, respectively, by means, not shown, such as threaded rods, in order to insure more rigidity to the assembly. The annular mounting rings 66 and 68, and the several shouldered disks are provided with an aperture, as shown at 78, to afford passage to the drive shaft 22.

An outer stator is also disposed coaxially to the rotor 26, as shown in FIGS. 1–5. The outer stator is formed of two horseshoe or half cylindrical permanent magnets 80 and 82, disposed coaxially with permanent magnets 54 and 56 of the inner stator and angularly oriented alike magnets 54 and 56. The planes of the longitudinal end faces 84 and 86 of magnets 80 and 82 form an air gap which is angularly oriented substantially alike the air gap formed between longitudinal end faces 88 and 90 of the inner stator magnets 54 and 56, respectively. The other longitudinal end faces 92 and 94 of magnets 80 and 82 form an air gap similarly oriented as the other air gap formed by the longitudinal end faces 96 and 98 of inner stator magnets 54 and 56, respectively. The semi-annular end faces 100 and 102 of magnets 80 and 82 are substantially in the same planes as respectively the semi-annular end faces 58 and 60 of magnets 54 and 56 of the inner stator, and the other ends of the outer stator also form half-annular end faces 104 and 106 substantially in a same plane as the half-annular end faces 62 and 64 of the inner stator magnets 54 and 56. Half-annular end faces 100 and 102 are respectively of the same magnetic polarity as half-annular end faces 58 and 60, and the other half-annular end faces at the other end of the magnets are similarly arranged with same magnetic polarity.

The magnets forming the outer stator are mounted within the housing 10 by means of annular rings 108 and 110 and spacers 112 and 114, using conventional fasteners, or cementing.

One end of the output shaft 22 is provided with, for example, a commutator disk 114, rigidly mounted on the shaft by means such as a set screw or a key and keyway arrangement, and which supports a pair of metallic annular rings 116 and 118, shown in the drawing as being substantially concentric, although it is evident that the annular rings may be in opposite faces of the disk or, alternately, on separate disks. The annular rings 116 and 118 are adapted to be engaged respectively by spring-biased brushes 120 and 122 connected by conductors 124 and 126 to the terminals 128 and 130 of a DC power supply. The commutator rings 116 and 118 are also connected to the coils or windings 34 and 36 of the rotor 26 by conductors, not shown on FIG. 2, but which may be disposed through the body of the commutator disk 114 and through adequate longitudinal bores through the shaft 22 to disk 24 and from there to the windings 34 and 36, so as to effectuate appropriate premutation of the current direction across the windings for proper operation of the motor.

The electric motor of the invention may be additionally provided with end stators on either end of the rotor 26 or on both ends thereof. As shown in FIG. 1 and more clearly in FIG. 2, such end stators each consist of a pair of horseshoe-shaped semi-annular magnets such as shown at 132 and 134, disposed so as to be longitudinally aligned substantially with the rotor 26 and supported from the housing by any appropriate mounting means such as mounting ring 135. As also shown in FIG. 1, in addition to half magnets 132 and 134 disposed on one end of the motor, a pair of half magnets 136 and 138 disposed symmetrically on the other end of the motor is also arranged in the same manner as magnets 132 and 134. The semi-annular end faces of each end magnet proximate the annular end faces of the magnets forming the inner and outer stators are angularly oriented the same as such faces and are magnetically oriented so as to be of the same polarity as the polarity of such inner and outer stator magnet end faces.

As schematically shown in FIGS. 6 and 7, commutator ring 116 consists of two half rings 116a and 116b insulated from each other and separated by gaps 133 and 135, and commutator ring 118 similarly consists of two half rings 118a and 118b insulated from each other and separated by gaps 137 and 139. Gaps 133 and 137, and 135 and 139 are respectively substantially at the same angular position and are such that half rings 116a and 118a are angularly oriented alike rotor winding 34, and half rings 116b and 118b are angularly oriented alike winding 36 of the rotor. Half ring 118a is connected to half ring 116b, by means of connection 140 and half rings 118a and 116b are oriented at 180° with respect to each other. Similarly, half ring 116a is 180° apart from half ring 118b and is electrically connected thereto by means of connection 142 so that the four half rings are electrically in parallel two by two. Windings 34 and 36 of the rotor 26 are also connected in parallel by means of interconnections 144 and 146, and interconnection 144 is connected to connection 142 by means of a line 148, interconnection 146 being similarly connected to connection 140 by means of a line 150. The connection between the windings 34 and 36 is such that electrical currents are caused to circulate therethrough in respective directions that cause, as previously mentioned, oppositely directed magnetic fields to be created thereby.

The operation of the heretofore described example of the invention is as follows:

Assuming that the motor is stopped with the rotor 26 occupying substantially the angular position shown in FIGS. 1–6 with respect to the stators, and assuming that the different magnets are arranged such that the left hand annular faces thereof, as seen in the drawings, are arbitrarily north poles for magnets 82, 60 and 136, and south poles for magnets 80, 58 and 138, now the directions of the currents circulating respectively in windings 34 and 36 are such that the left half annular end face of winding 34 has a south pole magnetic polarity while the left half annular end face of winding 36 has a north pole magnetic polarity. The respective windings 34 and 36 being situated between stators of similar polarity are repelled thereby, i.e., winding 36 is repelled by magnets 82, 56 and 136, being of the same polarity, and is attracted by magnets 84, 54 and 138 of opposite polarity.

Further assuming that the gap separating the windings 34 and 36 is slightly clockwise from the gap separating the longitudinal end faces 84 and 86 of outer magnets 80 and 82, winding 36 being repelled by the magnets proximate thereto and being attracted by magnets 80, 54 and 138 is caused to rotate clockwise in direction of the arrow. The brushes 120 and 122 are substantially in radial angular alignment with each other. The radius passing through the brushes makes an angle of approximately 20° with the diameter passing through the diametrically opposed longitudinal air gaps between the rotor windings 34 and 36, i.e. between commutator ring gaps 133–137 and commutator ring gaps 135–139. Consequently, coil or winding 36 of the rotor is repelled by the stator magnets 82, 56 and 136 and is attracted by the stator magnets 80, 54 and 136 with greater forces than coil or winding 34 of the rotor is repelled by magnets 82, 56 and 138 and attracted by magnets 82, 56 and 136. In this manner, the rotor is caused to rotate in a clockwise direction as indicated by the arrows in FIGS. 6 and 7, and there is an insurance that the rotor of the motor will always start rotating in the appropriate direction.

It is evident that when the rotor has rotated approximately 180°, and occupies the position shown in FIG. 7, brushes 120 and 122 having passed over ring gaps 136 and 132 are now engaging respectively half ring or segments 118b and 116b instead of 118a and 116a, thus causing a current reversal through the rotor coils or windings 34 and 36. The magnetic fields created by the current passing through the coils or windings are thus reversed, winding 36 presents on both its ends a magnetic polarity which is the same as the polarity of its proximate stator magnets at the same time as the commutation is effected with respect to coil 34 to reverse the current therethrough so as to cause a reversal of the magnetic flux created by the said windings. Consequently, the rotor continues to rotate as a result of the repulsive and attractive forces being developed between the coils or windings and the stator permanent magnets.

It is further evident that although an example of an embodiment of the present invention has been described with respect to a direct current electrical motor having a pair of windings on the rotor and two groups of permanent magnets, electric motors or generators can be made in accordance with the principles of the present invention which use more than two windings on the rotor and more than two groups of permanent magnets forming the stator, the only requirement being that the number of pair of windings on the rotor be equal to the number of pair of oppositely oriented permanent magnets forming the stator.

It is obvious that although an illustrative example of the invention has been described in detail wherein the stators consist of permanent magnets, this arrangement being the simplest, least expensive and preferred construction, motors or generators according to the invention may be made with some, or all, stators consisting of electromagnets, such being the arrangement contemplated where it is sought to run a motor according to the invention on AC, or to provide an AC generator.

While the foregoing description sets forth the principles of the invention in connection with a specific structure, it will be appreciated by those skilled in the art that the description is made only by way of example and not by limitation of the scope of the invention as set forth in the accompanying claims.

What is claimed as new is:

1. A dynamoelectric machine comprising:
 a frame;
 a rotatable shaft supported by said frame;
 a hollow cylindrical rotor mounted coaxially on said shaft;
 a pair of half cylindrical annular windings on said rotor wound so as to simultaneously cause a pair of magnetic fields directed in opposite directions;
 a first pair of half cylindrical parallel annular stators, one of said stators being disposed within and the other being disposed without said rotor;
 a second pair of half cylindrical parallel annular stators, one of said stators being disposed within and the other being disposed without said rotor;
 each of said stators being a magnet having opposite poles on the half annular end faces thereof, and the stators of a pair being magnetically oriented similarly and in an opposite direction to the orientation of the stators of the other pair;
 and commutating means for electrically connecting said windings to a source of EMF so as to cause each of said windings to form magnetic fields of the same direction as the magnetic fields caused by each of said pairs of stators so as to be repelled thereby and attracted by the other pair.

2. The dynamoelectric machine of claim 1 further comprising:
 a pair of half cylindrical annular end stators proximate each end of said rotor, each of said half cylindrical end stators being a magnet having a half annular end face of same pole as the end faces of the pair of magnets of said stators proximate thereto.

3. The dynamoelectric machine of claim 1 wherein said magnets are permanent magnets and wherein said commutating means comprise:
 a pair of annular rings supported by said shaft for rotation thereby, each of said rings being in two segments separated by a pair of gaps angularly disposed at 180° from each other and the gaps of both rings being disposed substantially at the same angular position;
 a pair of brushes placed across a source of direct current, each brush engaging one of said annular rings;
 first means connecting in parallel a segment of one ring with the segment of the other ring 180° angularly apart therefrom;
 second means connecting the windings in parallel;
 and means connecting said first and second means two by two.

4. The dynamoelectric machine of claim 3 wherein said shaft is power driven and said brushes are connected to a utilization circuit.

5. A dynamoelectric machine comprising:
 a frame;
 a shaft rotatably supported by said frame;
 a hollow cylindrical rotor mounted coaxially on said shaft and having at least one pair of windings arranged to simultaneously cause at least one pair of magnetic fields having end poles magnetically opposite to each other;

at least a first pair of inner half annular magnets disposed coaxially and within said rotor with their end poles magnetically opposite to each other;

at least one second pair of outer half annular magnets disposed coaxially and without said rotor with their end poles magnetically opposite to each other;

said inner and outer half annular magnets being angularly parallel two by two and having their end poles magnetically similar;

and commutating means connecting each of said windings to a source of EMF so as to cause the magnetic polarity of each end of each winding to be the same as the polarity of the ends of the inner and outer half annular magnets when said windings become angularly positioned substantially proximately said magnets;

wherein the number of inner magnets, outer magnets and windings are equal.

6. The dynamoelectric machine of claim 5 further comprising:

at least one pair of end magnets disposed proximate each end of said rotor, the number of said magnets on each end being equal to the number of windings on said rotor and each of said end magnets being of the same magnetic pole as the magnetic poles of the inner and outer magnets proximate thereto and being angularly positioned in alignment therewith.

7. The dynamoelectric machine of claim 5 wherein said commutating means causes as many current reversals in said windings per revolution of said rotor as there are pairs of windings on said rotor.

8. The dynamoelectric machine of claim 5 wherein said commutating means comprises:

a pair of annular rings supported by said shaft for rotation thereby, each of said ring having as many segments as there are windings on said rotor, said segments being separated by gaps and the gaps of one ring being substantially angularly aligned with the gaps of the other ring two by two;

a pair of brushes placed across the source of EMF, each brush engaging one of said rings;

first means connecting in parallel a segment of one ring with the segment of the other ring 180° angularly apart therefrom;

second means connecting the windings in parallel;

and means connecting said first and second means two by two.

9. The dynamoelectric machine of claim 5 wherein said magnets are permanent magnets and said brushes are connected to a source of direct current.

10. The dynamoelectric machine of claim 6 where said magnets are permanent magnets, said shaft is power driven and said brushes are connected to a utilization circuit.

References Cited

UNITED STATES PATENTS

| | | | |
|---|---|---|---|
| 752,692 | 2/1904 | LePontois | 310—155 |
| 1,620,747 | 3/1927 | Allison | 310—112 X |
| 2,159,768 | 5/1939 | MacMillan | 310—152 |
| 3,290,528 | 12/1966 | Adler et al. | 310—266 |

WARREN E. RAY, *Primary Examiner.*

U.S. Cl. X.R.

310—154, 184, 254, 266